United States Patent
He et al.

(10) Patent No.: US 9,539,616 B2
(45) Date of Patent: Jan. 10, 2017

(54) INFRASOUND GENERATING DEVICE BASED ON A DISPLACEMENT-FEEDBACK TYPE VIBRATION EXCITER

(75) Inventors: Wen He, Hangzhou (CN); Longbiao He, Hangzhou (CN); Chunyu Wang, Hangzhou (CN); Yuanlai Zhou, Hangzhou (CN); Shushi Jia, Hangzhou (CN)

(73) Assignees: ZHEJIANG UNIVERSITY, Hangzhou (CN); NATIONAL INSTITUTE OF METROLOGY P. R. CHINA, Beijing (CN)

( * ) Notice: Subject to any disclaimer, the term of this patent is extended or adjusted under 35 U.S.C. 154(b) by 392 days.

(21) Appl. No.: 14/130,892

(22) PCT Filed: Aug. 16, 2012

(86) PCT No.: PCT/CN2012/080210
§ 371 (c)(1),
(2), (4) Date: Jan. 3, 2014

(87) PCT Pub. No.: WO2013/104188
PCT Pub. Date: Jul. 18, 2013

(65) Prior Publication Data
US 2014/0140179 A1    May 22, 2014

(30) Foreign Application Priority Data
Jan. 11, 2012 (CN) .......................... 2012 1 0007148

(51) Int. Cl.
*B06B 1/10* (2006.01)
*B06B 1/02* (2006.01)
(Continued)

(52) U.S. Cl.
CPC ............... *B06B 1/10* (2013.01); *B06B 1/0246* (2013.01); *B06B 1/045* (2013.01); *G01H 3/005* (2013.01); *B06B 2201/40* (2013.01)

(58) Field of Classification Search
CPC ....................................................... B06B 1/10
(Continued)

(56) References Cited

U.S. PATENT DOCUMENTS

| 9,097,603 B2 * | 8/2015 | He ......................... G01M 7/022 |
| 2011/0096950 A1 * | 4/2011 | Rougas ..................... H04R 1/20 381/338 |

FOREIGN PATENT DOCUMENTS

| CN | 2375389 Y | 4/2000 |
| CN | 101259466 A | 9/2008 |

(Continued)

OTHER PUBLICATIONS

Machine Translation of JP 2011-015237.*

*Primary Examiner* — Luke Ratcliffe
*Assistant Examiner* — John T Nolan
(74) *Attorney, Agent, or Firm* — Jiwen Chen

(57) ABSTRACT

The infrasound generating device based on a displacement-feedback type vibration exciter comprises a displacement-feedback type vibration exciter system, an infrasound generating chamber (3) and a laser vibrometer (1); the displacement feedback mechanism is adopted in the vibration exciter (2). The piston (31) is driven by the vibration exciter to move in a sinusoidal manner in the cavity (35) of the airtight infrasound generating chamber (3) and the standard infrasonic pressure signal with low harmonic distortion can be achieved. The displacement of the moving part (22) of the vibration exciter (2) can be measured by the laser vibrometer (1) through the measurement beam (15) injecting into the vibration exciter (2) through the optical channel running through the vibration exciter and the standard infrasonic pressure can also be obtained. The value of the standard sound pressure produced by the infrasound (Continued)

generating chamber is calculated. Such value is used as the calibration reference for the infrasound sensors (4) to be calibrated in order to achieve the primary calibration of the infrasound sensors. The standard infrasonic sensor can be installed inside the infrasound generating chamber (3) and the output of the standard infrasonic sensor can be used as the reference for the infrasonic sensor (4) to be calibrated in order to achieve the secondary calibration of the infrasound sensors. This invention has the advantages of technical maturity, high feasibility, easy to realize, high calibration accuracy and so on.

9 Claims, 3 Drawing Sheets

(51) Int. Cl.
*B06B 1/04* (2006.01)
*G01H 3/00* (2006.01)

(58) Field of Classification Search
USPC .......................................... 376/190; 367/190
See application file for complete search history.

(56) References Cited

FOREIGN PATENT DOCUMENTS

| | | | |
|---|---|---|---|
| CN | 101403635 A | | 4/2009 |
| CN | 101788331 A | | 7/2010 |
| CN | 101871807 A | | 10/2010 |
| CN | 102128027 A | | 7/2011 |
| JP | 2011-015237 | * | 1/2011 |
| JP | 2011-15237 A | | 1/2011 |

* cited by examiner

INFRASOUND GENERATING DEVICE BASED ON A DISPLACEMENT-FEEDBACK TYPE VIBRATION EXCITER

This is a U.S. national stage application of PCT Application No. PCT/CN2012/080210 under 35 U.S.C. 371, filed Aug. 16, 2012 in Chinese, claiming the priority benefit of Chinese Application No. 201210007148.9, filed Jan. 11, 2012, which is hereby incorporated by reference.

FIELD OF THE INVENTION

The present invention relates to an infrasound generating device, especially an infrasound generating device that can produce a standard infrasonic pressure signal and can be used to calibrate infrasonic sensors.

BACKGROUND OF THE INVENTION

The infrasound exists widely in nature and human life, such as volcanic eruption, earthquake, nuclear explosion, rocket launching, supersonic aircraft flight, etc. In recent years, infrasound detection has received more and more attention in environmental protection, military surveillance and so on. In addition, the infrasound has the characteristics of long propagation distance, strong penetration ability and difficult to be detected, etc. So the infrasound is adopted more and more widely in the areas of military, medical, industry and so on.

Infrasonic sensors are crucial to the detection and application of the infrasound. According to the metrological verification regulations, an infrasonic sensor must be calibrated for its performance indicators such as the sensitivity before delivery or after being used for a period of time. The infrasound calibration system is an important guarantee for the development of the infrasonic sensor technology. The infrasound generating device produces standard infrasonic pressure signal and the calibration of the infrasonic sensor is conducted with the primary method or the secondary method. The infrasound generating device is an important component in the infrasound calibration system. The accuracy of the outputted infrasonic pressure signal of the device directly determines the calibration accuracy of the infrasonic sensor. At present, most of the infrasound generating devices are achieved by the motor or vibrator driving the piston to reciprocate and then the sinusoidal infrasonic pressure signal is generated. However, due to the nonlinear parameters, the harmonic distortion of generated infrasonic pressure signal is large and the calibration accuracy of the infrasonic sensor is then affected.

SUMMARY OF THE INVENTION

In order to overcome the shortcomings of the prior art, such as large harmonic distortion, the present invention proposes an infrasound generating device based on a displacement-feedback type vibration exciter, which can produce an infrasonic signal with low distortion to ensure the calibration accuracy of infrasonic sensors.

The infrasound generating device based on a displacement-feedback type vibration exciter comprises a displacement-feedback type vibration exciter system, an infrasound generating chamber and a laser vibrometer measuring the vibration displacement of the vibration exciter, and the standard infrasonic pressure generated in the infrasound generating chamber is calculated through the vibration displacement measured by the laser vibrometer.

The displacement-feedback type vibration exciter system comprises a signal generator, a power amplifier, a vibration exciter and a displacement-feedback component. The displacement-feedback component comprises a displacement sensor measuring the displacement of the moving part of the vibration exciter, a comparator comparing the displacement signal with the standard signal produced by the signal generator to obtain their deviation and a controller processing the deviation signal. A signal conditioning circuit is adopted between the displacement sensor and the comparator to handle the displacement signal. The displacement signal detected by the displacement sensor is processed by the signal conditioning circuit and is then subtracted as subtrahend by the standard output of the signal generator to obtain the difference between them. The difference is further processed by the controller and is then amplified by the power amplifier. The output of the power amplifier drives the exciter to rectify the deviation. Then the output displacement of the exciter can precisely follow the standard signal produced by the signal generator and the harmonic distortion of the output displacement signal from the exciter is reduced, as well as the output infrasonic pressure signal from the infrasound generating device.

The vibration exciter is equipped with an optical channel allowing the measurement beam of the laser vibrometer to travel through and a reflector reflecting the measurement beam back to the laser vibrometer. The measurement beam injects into the vibration exciter from the end of the exciter and the reflector is attached to the back of the moving part of the vibration exciter.

The infrasound generating chamber is airtight and there is a piston fitting with the chamber. The piston is tightly connected with the front of the moving part of the vibration exciter, and the infrasonic sensor to be calibrated is installed inside the infrasound generating chamber.

The working principle of the infrasound generating device is as follows: In an airtight is chamber whose length is much less than the wavelength of the sound wave in the medium of the airtight chamber (the maximum size is ¹/₂₀ of the wavelength), the movement of the piston results in the generation of the pressure wave. According to the adiabatic gas law, the pressure of the sound field in the infrasound generating chamber can be expressed as $$p = \pi \frac{\gamma P_0 d^2 x}{4V_0} \quad (1)$$

where p is the sound pressure; γ is the specific heat ratio of the air; $P_0$ is the static pressure; d is the diameter of the piston; x is the displacement of the piston; $V_0$ is the volume of the airtight chamber when the piston is at its equilibrium position. The displacement x measured by the laser vibrometer is substituted into the above equation (1) and the sound pressure in the airtight chamber can be calculated. Then the calibration of the infrasonic sensor can be conducted with the primary method. In this device, the harmonic distortion of the output displacement of the displacement-feedback type vibrator can be quite low. Thus, according to the above equation (1), the distortion of the infrasonic pressure signal in the infrasound generating device is low as well.

In addition, the sound pressure generated according to the above equation (1) can be chosen as the reference for the calibration of the infrasonic sensor to be calibrated; or there is a standard infrasonic sensor in the infrasound generating chamber and its output can be chosen as the reference for the calibration of the infrasonic sensor.

In addition, the infrasound generating chamber comprises a chamber, a piston fitting with the chamber, a sealing device of the chamber at the piston side, a sealing cap for the installation of the infrasonic sensor and a base supporting the chamber.

In addition, there is a hole in the sealing cap for the infrasonic sensor installation and a sealing sleeve is adopted between the hole and the infrasonic sensor to be calibrated. If another standard infrasonic sensor is also adopted inside the chamber, there is another corresponding hole for the standard infrasonic sensor installation and another sealing sleeve is also adopted between the hole and the standard infrasonic sensor.

In addition, the sealing device of the chamber at the piston side comprises an integrated sealing membrane and an annular sealing element attaching to the integrated sealing membrane on the infrasound generating chamber. The annular sealing element comprises a fixed part attached to the infrasound generating chamber through screws and an annular platen attaching the integrated sealing membrane to the fixed part. The integrated sealing membrane comprises an outer ring attaching with the annular sealing element, an inner ring attaching to the piston and a rubber membrane connecting the outer and inner ring. There is a first installation groove fitting with the outer ring in the fixed part and there is a second installation groove fitting with the inner ring in the piston. As a result, the chamber and the piston are sealed through the integrated sealing membrane and the complete seal is achieved.

Or, there is no integrated sealing membrane in the sealing device of the chamber at the piston side but only a piston sleeve attached in the chamber. The chamber is sealed through the clearance between the piston and the piston sleeve, and the clearance seal is achieved.

In addition, the infrasound generating device also comprises a laser vibrometer base supporting the laser vibrometer, a vibration exciter base supporting the vibration exciter, a chamber mounting plate supporting the infrasound generating chamber and a working plate placing the measuring instrument and other tools. The chamber mounting plate and the working plate are installed on the chamber base. The laser vibrometer is placed on the laser vibrometer base through adjustable supporting feet at the bottom of the laser vibrometer and the laser vibrometer base is placed on the foundation through cushions. The vibration exciter base and the chamber base are installed on the foundation through adjustable shims. The measuring instrument and other tools refer to the measuring or other auxiliary tools used in the measuring process.

The technical consideration of the present invention is as follows: The displacement-feedback type vibration exciter drives the piston to move in a sinusoidal manner in the airtight infrasound generating chamber. Then the pressure in the chamber also changes accordingly and the standard infrasonic pressure signal with low harmonic distortion can be achieved. The displacement of the moving part of the vibration exciter can be measured by the laser vibrometer through the measurement beam injecting into the vibration exciter through the optical channel and the standard infrasonic pressure can also be obtained. The piston and the chamber can be sealed in a complete or a clearance way.

The present invention makes full use of the technically mature vibration exciter to produce vibration at the infrasonic frequency and the displacement-feedback control technology is also introduced to reduce the harmonic distortion of generated infrasound pressure signal. This invention has the advantages of technical maturity, high feasibility, easy to achieve, high calibration accuracy and so on.

DETAILED DESCRIPTION OF THE INVENTION

Embodiment 1

Figure 1:
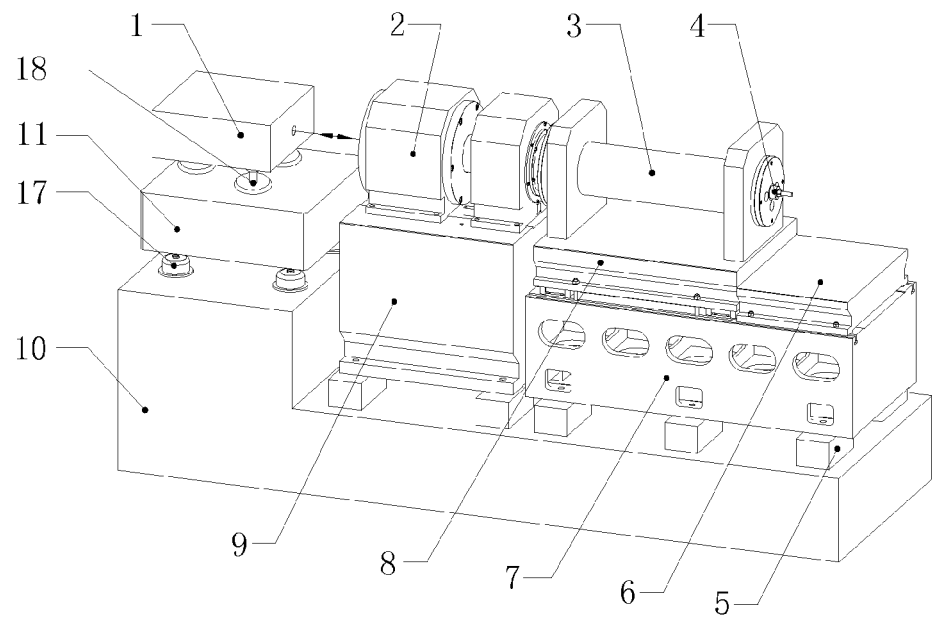
FIG. 1 is a structure drawing of an infrasound generating device based on a displacement-feedback type vibration exciter.
Figure 2:
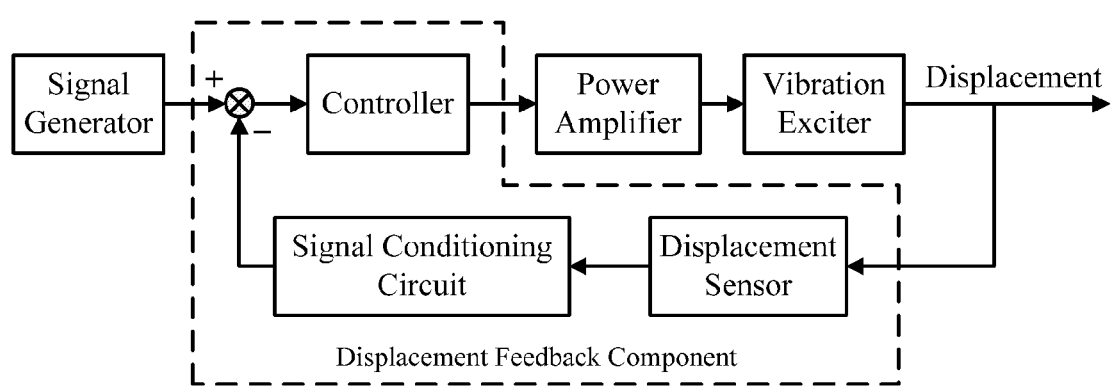
FIG. 2 is a structure diagram of the displacement-feedback type vibration exciter system.
Figure 3:
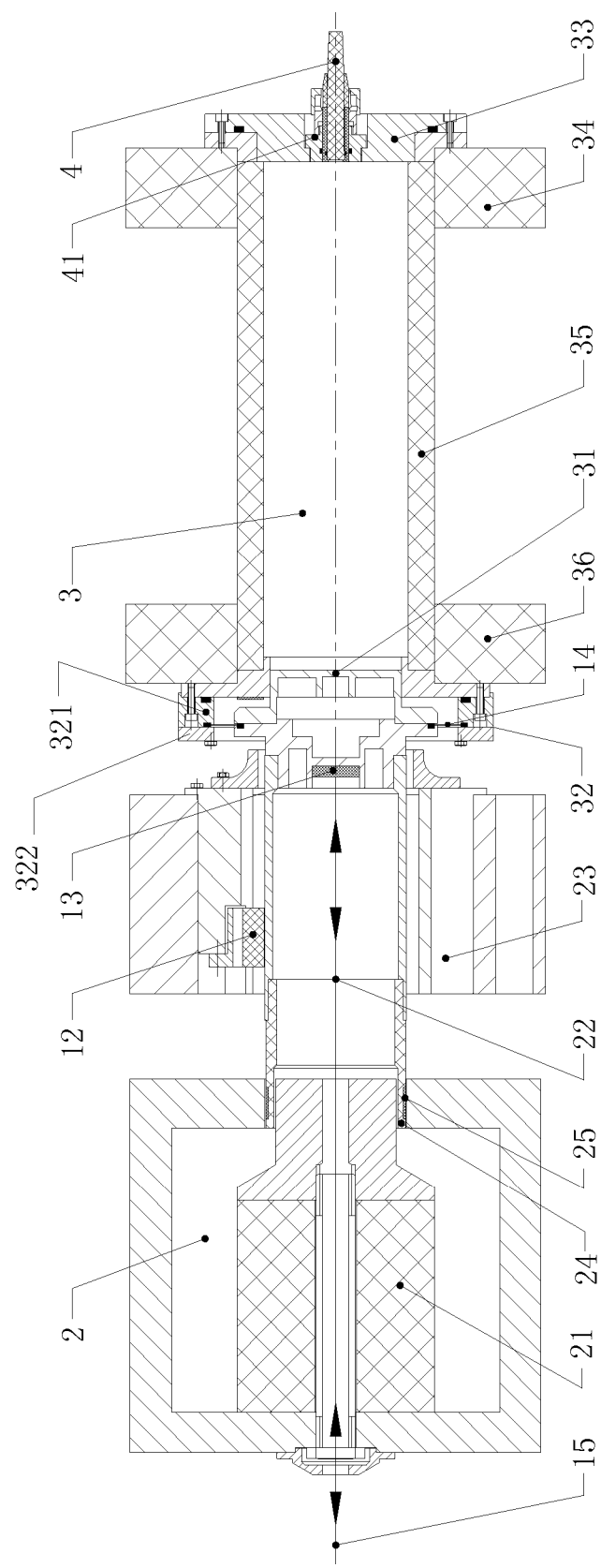
FIG. 3 is a structure drawing of the connection between the vibration exciter and the infrasound generating chamber in the first embodiment.
Figure 4:
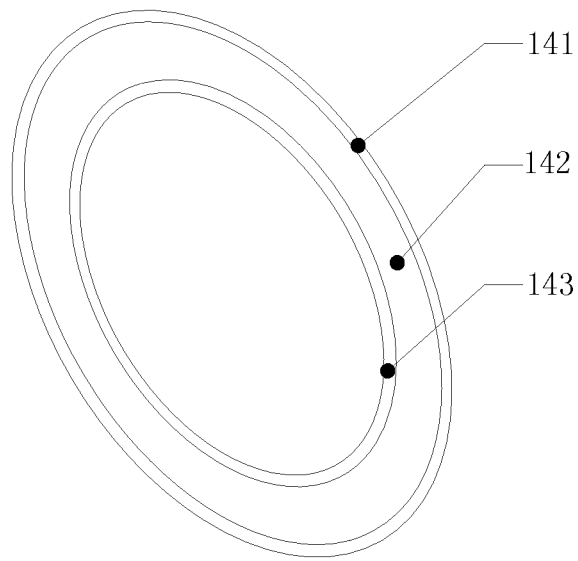
FIG. 4 is a structure drawing of the integrated sealing membrane adopted in the infrasound generating chamber in the first embodiment.

Reference is made to FIGS. 1-4.

The infrasound generating device based on a displacement-feedback type vibration exciter comprises a displacement-feedback type vibration exciter system, an infrasound generating chamber 3 and a laser vibrometer 1 measuring the vibration displacement of the vibration exciter 2, and the standard infrasonic pressure generated in the infrasound generating chamber 3 is calculated through the vibration displacement measured by the laser vibrometer 1.

The displacement-feedback type vibration exciter system comprises a signal generator, a power amplifier, a vibration exciter 2 and a displacement-feedback component; The displacement-feedback component comprises a displacement sensor 12 measuring the displacement of the moving part 22 of the vibration exciter, a comparator comparing the displacement signal with the standard signal produced by the signal generator to obtain their deviation and a controller processing the deviation signal. A signal conditioning circuit is adopted between the displacement sensor and the comparator to handle the displacement signal.

The displacement signal detected by the displacement sensor is processed by the signal conditioning circuit and is then subtracted as subtrahend by the standard output of the signal generator to obtain the difference signal between them. The difference is further processed by the controller and is then amplified by the power amplifier. The output of the power amplifier drives the exciter to rectify the deviation. Then the output displacement of the exciter can precisely follow the standard signal produced by the signal generator and the harmonic is distortion of the output displacement signal from the exciter is reduced, as well as the output infrasonic pressure signal from the infrasound generating device.

The vibration exciter 2 is equipped with an optical channel 16 allowing the measurement beam 15 of the laser vibrometer 1 to travel through and a reflector 13 reflecting the measurement beam 15 back to the laser vibrometer 1. The measurement beam 15 injects into the vibration exciter 2 from the end of the exciter and the reflector 13 is attached to the back of the moving part 22 of the vibration exciter.

The infrasound generating chamber 3 is airtight and there is a piston 31 fitting with the chamber. The piston 31 is tightly connected with the front of the moving part 22 of the vibration exciter and the infrasonic sensor to be calibrated 4 is installed inside the infrasound generating chamber 35.

The working principle of the infrasound generating device is as follows: In an airtight chamber whose length is much less than the wavelength of the sound wave in the medium of the airtight chamber (the maximum size is 1/20 of the wavelength), the movement of the piston results in the generation of the pressure wave. According to the adiabatic gas law, the pressure of the sound field in the infrasound generating chamber can be expressed as $$p = \pi \frac{\gamma P_0 d^2 x}{4V_0} \quad (1)$$

where p is the sound pressure; $\gamma$ is the specific heat ratio of the air; $P_0$ is the static pressure; d is the diameter of the piston; x is the displacement of the piston; $V_0$ is the volume of the airtight chamber when the piston is at its equilibrium position. The displacement x measured by the laser vibrometer is substituted into equation (1) and the sound pressure in the airtight chamber can be calculated. Then the calibration of the infrasonic sensor can be conducted with the primary method. In this device, the harmonic distortion of the output displacement of the displacement-feedback type vibrator can be quite low. Thus, according to equation (1), the distortion of the infrasonic pressure signal in the infrasound generating device is low as well.

In addition, the sound pressure generated according to equation (1) can be chosen as the reference for the calibration of the infrasonic sensor 4 to be calibrated. If there is only an infrasonic sensor 4 to be calibrated inside the infrasound generating chamber 35, the sensor 4 to be calibrated can be calibrated with the primary method through measuring the sensor output and combining the standard infrasonic pressure.

When both an infrasonic sensor to be calibrated and a standard infrasonic sensor are installed inside the infrasonic chamber 35, the output of the standard sensor can be chosen as the reference for the calibration of the infrasonic sensor, which can be achieved with the secondary method through measuring the output of the standard sensor and the sensor to be calibrated.

The vibration exciter 2 is the electromagnetic type. The vibration exciter 2 comprises an excitation component 21, a moving part 22 and a guiding component 23. The excitation component 21 is a magnetic circuit composed of the permanent magnet or the electromagnet and a magnetic field in air gap 24 with uniform magnetic flux density is achieved. When the armature coil 25 of the moving part 22 installed in the air gap 24 is driven by a sinusoidal current, an induced electromagnetic force proportional to the current is produced and it drives the moving part 22 to move in a sinusoidal manner. The guiding component 23 can support and guide the moving part 22 to move in the vibration direction. Other transverse motion in other directions is limited. The aerostatic bearing is adopted as the guiding component for the moving part of the vibration exciter in this embodiment.

An optical linear encoder is adopted as the displacement sensor 12. The reading head of the optical linear encoder is installed on the guiding component 23 of the electromagnetic vibration exciter 2. The scale of the optical linear encoder is installed on the moving part 22 of the vibration exciter 2.

The measurement beam from the laser vibrometer injects into the vibration exciter 2 through a small hole at the end of the exciter. There is also a through-hole running through the excitation component 21 and the moving part 22 of the vibration exciter to allow the measurement beam to travel through. The small hole at the end of the exciter and the through-hole running through the excitation component 21 and the moving part form the optical channel 16 allowing the measurement beam 15 to travel through. A reflector mirror or a reflector film attached to the back of the moving part 22 of the vibration exciter 2 can be adopted as the reflector 13. The measurement beam 15 is reflected by the reflector 13 into the laser vibrometer 1 through the optical channel 16. Thus, the displacement of the vibration exciter moving part 22 can be obtained.

The infrasound generating chamber 3 comprises a chamber 35, a piston 31 fitting with the chamber 35, a sealing device 32 of the chamber at the piston side, a sealing cap 33 for the installation of the infrasonic sensor and bases 34 and 36 supporting the chamber. The piston 31 is connected with the front of the vibration exciter moving part 22 and the moving part 22 drives the piston 31 to move inside the chamber 35. The piston 31, the sealing device 32 of the chamber at the piston side, the sealing cap 33 for the installation of the infrasonic sensor and the chamber form an airtight chamber.

There is a hole in the sealing cap 33 for the infrasonic sensor installation and a sealing sleeve 41 is adopted between the hole and the infrasonic sensor 4 to be calibrated. The sensor 4 to be calibrated is put inside the sealing sleeve 41 and the sealing sleeve 41 is put inside the hole. If another standard infrasonic sensor is also adopted inside the chamber, there is another corresponding hole for the standard infrasonic sensor installation and a sealing sleeve is also adopted between the hole and the standard infrasonic sensor.

The sealing device 32 of the chamber at the piston side comprises an integrated sealing membrane 14 and an annular sealing element attaching the integrated sealing membrane 14 to the infrasound generating chamber 3. The annular sealing element comprises a fixed part 321 attached to the infrasound generating chamber through screws and an annular platen 322 attaching the integrated sealing membrane to the fixed part. The integrated sealing membrane 14 comprises an outer ring 141 attaching with the annular sealing element, an inner ring 142 attaching with the piston 31 and a rubber membrane 143 connecting the outer ring 141 and the inner ring 142. There is a first installation groove fitting with the outer ring 141 in the fixed part and there is a second installation groove fitting with the inner ring 142 in the piston 32. As a result, the chamber 35 and the piston 31 are sealed through the integrated sealing membrane 14 and the complete seal is achieved.

The infrasound generating device also comprises a laser vibrometer base 11 supporting the laser vibrometer 1, a vibration exciter base 9 supporting the vibration exciter 2, a chamber mounting plate 8 supporting the infrasound generating chamber 3 and a working plate 6 placing the measuring instrument and other tools. The chamber mounting plate 8 and the working plate 6 are installed on the chamber base 7. The laser vibrometer is placed on the laser vibrometer base 11 through adjustable supporting feet 18 at the bottom of the laser vibrometer and the laser vibrometer base 11 is placed on the foundation 10 through cushions 17. The vibration exciter base 9 and the chamber base 7 are installed on the foundation 10 through adjustable shims 5. The levelness and the height of the vibration exciter base 9 and the chamber mounting plate 8 can be adjusted through the adjustable shims 5. The levelness and the height of the measurement beam 15 can be adjusted through the adjustable supporting feet 18. Then the measurement beam 15 of the laser vibrometer 1, the moving part 22 of the vibration exciter 2 and the infrasound generating chamber 3 keep coaxial.

The technical consideration of the present invention is as follows: The displacement-feedback type vibration exciter 2 drives the piston 31 to move in a sinusoidal manner in the airtight infrasound generating chamber 35. Then the pressure in the chamber also changes accordingly and the standard infrasonic pressure signal with low harmonic distortion can be achieved. The displacement of the moving part 22 of the vibration exciter can be measured by the laser vibrometer 1 through the measurement beam injecting into the vibration exciter 2 through the optical channel 16 and the standard infrasonic pressure can also be obtained.

The present invention makes full use of the technically mature vibration exciter to produce vibration at the infrasonic frequency and the displacement-feedback control technology is also introduced to reduce the harmonic distortion of generated infrasound pressure signal. This invention has the advantages of technical maturity, high feasibility, easy to realize, high calibration accuracy and so on.

Embodiment 2

Figure 5:
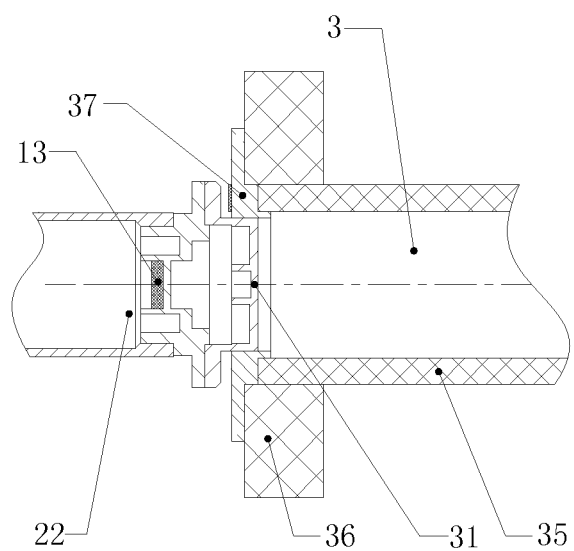
FIG. 5 is a structure drawing of the connection between the piston and the infrasound generating chamber in the second embodiment.

Referring to FIG. 5, different from embodiment 1, there is only a piston sleeve 37 attached in the infrasound generating chamber 35 at the piston side. The chamber is sealed through the clearance between the piston 31 and the piston sleeve 37. The other structures are the same as embodiment 1.

The sealing device of the chamber at the piston side just comprises the piston sleeve 37 attached in the infrasound generating chamber 35. The chamber is sealed through the clearance between the piston 31 and the piston sleeve 37, not through an integrated sealing membrane. The clearance seal is achieved.

The specific embodiments discussed are merely illustrative of specific ways to make and use the invention, and do not limit the scope of the invention. Meanwhile, it should be appreciated that various modifications and their equivalents can be devised by those skilled in the art and will fall within the spirit and scope of the principles of the disclosure.

What is claimed is:

1. An infrasound generating device based on a displacement-feedback type vibration exciter comprising:

a displacement-feedback type vibration exciter system, an infrasound generating chamber and a laser vibrometer measuring the vibration displacement of the displacement-feedback type vibration exciter, wherein standard infrasonic pressure generated in the infrasound generating chamber is calculated through vibration displacement measured by the laser vibrometer:

$$p = \pi \frac{\gamma P_0 d^2 x}{4V_0},$$

where p is sound pressure; y is specific heat ratio of the air; $P_0$ is static pressure; d is diameter of a piston; x is displacement of the piston; $V_0$ is volume of the airtight chamber when the piston is at its equilibrium position;

the displacement-feedback type vibration exciter system comprising a signal generator, a power amplifier, a vibration exciter and a displacement-feedback component; the displacement-feedback component comprising a displacement sensor measuring the displacement of a moving part of the displacement-feedback type vibration exciter, a comparator comparing a displacement signal with a standard signal produced by the signal generator to obtain the deviation between the standard signal and the displacement signal and a controller processing a deviation signal, a signal conditioning circuit being adopted between the displacement sensor and the comparator to process the displacement signal; the moving part of the displacement-feedback type vibration exciter being driven by the controller and the power amplifier being adopted between the controller and the displacement-feedback type vibration exciter to amplify an output control signal of the controller;

the vibration exciter being equipped with an optical channel allowing a measurement beam of the laser vibrometer to travel through and a reflector reflecting the measurement beam back to the laser vibrometer, the measurement beam injecting into the vibration exciter from the exciter end and the reflector being attached to a back end of the moving part of the vibration exciter; and the infrasound generating chamber being airtight and the piston operatively fitting in the chamber, the piston being tightly connected with a front end of the moving part of the vibration exciter and an infrasonic sensor to be calibrated being installed inside the infrasound generating chamber.

2. The infrasound generating device based on a displacement-feedback type vibration exciter according to claim 1, wherein the generated standard sound pressure obtained by the laser vibrometer through vibration displacement calculation is chosen as a reference for the calibration of the infrasonic sensor to be calibrated.

3. The infrasound generating device based on a displacement-feedback type vibration exciter according to claim 1, wherein there is a standard infrasonic sensor in the infrasound generating chamber and its output is chosen as a reference for the calibration of the infrasonic sensor.

4. The infrasound generating device based on a displacement-feedback type vibration exciter according to claim 1, wherein the infrasound generating chamber comprises a chamber, a piston fitting with the chamber, a sealing device of the chamber at the piston side, a sealing cap for installation of the infrasonic sensor and a base supporting the chamber.

5. The infrasound generating device based on a displacement-feedback type vibration exciter according to claim 4, wherein there is a first hole in the sealing cap for the infrasonic sensor installation and a first sealing sleeve is adopted between the first hole and the infrasonic sensor to be calibrated.

6. The infrasound generating device based on a displacement-feedback type vibration exciter according to claim 5, wherein, when another standard infrasonic sensor is also adopted inside the chamber, there is a corresponding second hole for the standard infrasonic sensor installation and a second sealing sleeve is also adopted between the second hole and the standard infrasonic sensor.

7. The infrasound generating device based on a displacement-feedback type vibration exciter according to claim 4, wherein the sealing device of the chamber at the piston side comprises an integrated sealing membrane and an annular sealing element attaching the integrated sealing membrane to the infrasound generating chamber, the annular sealing element comprises a fixed part attached to the infrasound generating chamber through screws and an annular platen attaching the integrated sealing membrane to the fixed part, the integrated sealing membrane comprises an outer ring attaching with the annular sealing element, an inner ring attaching with the piston and a rubber membrane connecting the outer and inner ring, there is a first installation groove fitting with the outer ring in the fixed part and there is a second installation groove fitting with the inner ring in the piston.

8. The infrasound generating device based on a displacement-feedback type vibration exciter according to claim 4, wherein there is only a piston sleeve attached in the chamber, the chamber is sealed through the clearance between the piston and the piston sleeve.

9. The infrasound generating device based on a displacement-feedback type vibration exciter according to claim 1, wherein the infrasound generating device also comprises a laser vibrometer base supporting the laser vibrometer, a vibration exciter base supporting the vibration exciter, a chamber mounting plate supporting the infrasound generating chamber and a working plate placing the measuring instrument and other tools, the chamber mounting plate and the working plate are installed on the chamber base, the laser vibrometer is placed on the laser vibrometer base through adjustable supporting feet at the bottom of the laser vibrometer and the laser vibrometer base is placed on the foundation through cushions, the vibration exciter base and the chamber base are installed on the foundation through adjustable shims.

* * * * *